US00RE50560E

(19) United States
(12) Reissued Patent
Hollenbeck et al.

(10) Patent Number: US RE50,560 E
(45) Date of Reissued Patent: Aug. 26, 2025

(54) HOLLOW METAL WAVEGUIDES HAVING IRREGULAR HEXAGONAL CROSS-SECTIONS AND METHODS OF FABRICATING SAME

(71) Applicant: Optisys, Inc., West Jordan, UT (US)

(72) Inventors: Michael Hollenbeck, West Jordan, UT (US); Robert Smith, West Jordan, UT (US)

(73) Assignee: Optisys, Inc., Salt Lake City, UT (US)

(21) Appl. No.: 17/718,195

(22) Filed: Apr. 11, 2022

Related U.S. Patent Documents

Reissue of:
(64) Patent No.: 11,211,680
Issued: Dec. 28, 2021
Appl. No.: 16/684,153
Filed: Nov. 14, 2019

U.S. Applications:
(60) Provisional application No. 62/767,481, filed on Nov. 14, 2018.

(51) Int. Cl.
*H01P 3/123* (2006.01)
*B22F 10/10* (2021.01)
(Continued)

(52) U.S. Cl.
CPC ..... *H01P 3/123* (2013.01); *B22F 10/10* (2021.01); *B22F 10/20* (2021.01); *B22F 10/385* (2021.01); *B33Y 80/00* (2014.12); *H01P 1/022* (2013.01); *H01P 1/025* (2013.01); *H01P 1/027* (2013.01); *H01P 11/002* (2013.01)

(58) Field of Classification Search
None
See application file for complete search history.

(56) References Cited

U.S. PATENT DOCUMENTS 2,409,913 A 10/1946 Tonks
3,396,350 A 8/1968 Krank et al.
(Continued)

FOREIGN PATENT DOCUMENTS

DE 102015103983 A1 9/2016
FR 3087954 A1 10/2018
(Continued)

OTHER PUBLICATIONS

Asao H et al. "Metal-plated plastic waveguide filter using injection molding process," 2003 IEEE MTT-S International Microwave Symposium Digest. (IMS 2003); [IEEE MTT-S International Microwave Symposium], New York, NY: IEEE, U.S., vol. 2, Jun. 8, 2003 (Jun. 8, 2003), pp. 941-944, XP010645060, DOI: 10.1109/MWSYM.2003.1212524 ISBN: 978-0-7803-7695-3.
(Continued)

*Primary Examiner* — Roland G Foster
(74) *Attorney, Agent, or Firm* — Terrence J. Edwards; TechLaw Ventures, PLLC

(57) ABSTRACT

A waveguide disclosed herein may be implemented as a hollow irregular hexagonal metal structure which receives an electromagnetic signal and propagates the signal through the hollow hexagonal metal structure. The waveguide may be fabricated using metal additive manufacturing techniques and include one or more downward facing and unsupported surfaces.

20 Claims, 13 Drawing Sheets

(51) Int. Cl.

| | |
|---|---|
| ***B22F 10/20*** | (2021.01) |
| ***B22F 10/38*** | (2021.01) |
| ***B33Y 80/00*** | (2015.01) |
| ***H01P 1/02*** | (2006.01) |
| ***H01P 11/00*** | (2006.01) |

(56) References Cited

U.S. PATENT DOCUMENTS

| | | | | |
|---|---|---|---|---|
| 3,777,286 | A | 12/1973 | Cramm et al. | |
| 4,297,658 | A | 10/1981 | Treczka | |
| 4,467,294 | A | 8/1984 | Janky et al. | |
| 6,018,315 | A | 1/2000 | Ince et al. | |
| 6,137,450 | A | 10/2000 | Bhattacharyya et al. | |
| 6,198,730 | B1 | 3/2001 | Hogberg et al. | |
| 6,501,434 | B1 | 12/2002 | Hollenstein et al. | |
| 7,480,435 | B2 * | 1/2009 | Brist et al. | H01P 3/121 385/129 |
| 9,253,925 | B1 | 2/2016 | Smith | |
| 10,170,833 | B1 | 1/2019 | Hollenbeck et al. | |
| 10,468,773 | B2 | 11/2019 | Hollenbeck et al. | |
| 10,481,253 | B1 | 11/2019 | Hollenbeck et al. | |
| 10,680,341 | B1 | 6/2020 | Anderson et al. | |
| 11,189,897 | B2 | 11/2021 | Uemichi | |
| 11,211,680 | B2 | 12/2021 | Hollenbeck et al. | |
| 11,233,304 | B2 | 1/2022 | Hollenbeck et al. | |
| 2012/0242428 | A1 | 9/2012 | Blech et al. | |
| 2013/0033404 | A1 | 2/2013 | Abe | |
| 2013/0321089 | A1 | 12/2013 | Ohashi et al. | |
| 2016/0254579 | A1 | 9/2016 | Mills | |
| 2020/0127358 | A1 | 4/2020 | de Rijk et al. | |
| 2020/0161738 | A1 | 5/2020 | de Rijk et al. | |
| 2020/0194855 | A1 | 6/2020 | Hollenbeck et al. | |
| 2020/0194860 | A1 | 6/2020 | Hollenbeck et al. | |
| 2020/0266510 | A1 | 8/2020 | Gomez et al. | |
| 2021/0126332 | A1 | 4/2021 | Uemichi | |

FOREIGN PATENT DOCUMENTS

| | | | |
|---|---|---|---|
| GB | 2275454 | B | 8/1994 |
| JP | 3750856 | B2 | 12/2005 |
| JP | 2021-179839 | B2 | 11/2021 |
| KR | 10/2340998 | B1 | 12/2021 |
| WO | 2017203568 | A1 | 11/2017 |
| WO | 2017208153 | A1 | 12/2017 |
| WO | 2018199036 | A1 | 11/2018 |
| WO | 2020106774 | A1 | 5/2020 |
| WO | 2020106774 | A2 | 5/2020 |

OTHER PUBLICATIONS

D'Auria Mario et al. "3-D Printed Metal-Pipe Rectangular Waveguides," IEEE Transactions on Components, Packaging and Manufacturing Technology, IEEE, USA, vol. 5, No. 9, Aug. 21, 2015 (Aug. 21, 2015), pp. 1339-1349, XP011669774, ISSN: 2156-3950, DOI: 10.1109/TCPMT.2015.2462130 [retreived on Sep. 21, 2015].

"European Search Report and Written Opinion," Received for PCT Application No. PCT/US2019/061491, Mailed Date: Jun. 27, 2022, 20 Pages.

"European Search Report and Written Opinion," Received for PCT Application No. PCT/US2019/062295, Mailed Date: Jul. 25, 2022, 35 Pages.

English translation of WO 2018199036 prepared by Google Patents on Jan. 10, 2023 (https://patents.google.com/patent/WO2018199036A1/en?oq=WO+2018199036).

English translation of DE 102015103983 prepared by Google Patents on Jan. 10, 2023 (https://patents.google.com/patent/DE102015103983A1/en?oq=DE+102015103983).

English translation of JP 3750856 prepared by Google Patents on Jan. 10, 2023 (https://patents.google.com/patent/JP3750856B2/en?oq=JP+3750856).

N. Nathrath, et al. "Lightweight Intersatellitelink Antenna (LISA) operating at Ka-Band," Technical University of Munich, Institute of Astronautics, Munich, Germany, Published Apr. 12, 2010, Downloaded on Apr. 23, 2023 UTC from IEEE Xplore, 4 Pages.

English translation of JP 2021179839A prepared by Google Patents on Jan. 18, 2024 (https://patents.google.com/patent/JP2021179839A/en?oq=JP2021179839).

English translation of KR 102340998B1 prepared by Google Patents on Jan. 18, 2024 (https://patents.google.com/patent/KR102340998B1/en?oq=KR+102340998B1+).

Machine translation prepared on Dec. 28, 2021, by Google Patents for Publication No. FR3087954A1.

Machine translation prepared on Feb. 22, 2022, by Google Patents for Publication No. WO 2017203568.

Motomi Abe, et al., "Ka-Band Branch Line Coupler Applied Hexagonal Waveguide Suitable for Additive Manufacturing," IEICE Trans. Electron., vol. E101-C, No. 10, Oct. 2018, pp. 805-814, The Institute of Electronics, Information and Communication Engineers.

Motomi Abe, et al., "A 3-D Metal-Direct-Printed, Low-Cost, and Light Hexagonal Waveguide Ka-Band Branch Line Coupler," Proceedings of the 47th European Microwave Conference, Oct. 2017, pp. 188-191, EuMA, Nuremberg Germany.

Zhang Kai, et al., "A Novel Design of Circularly Polarized Waveguide Antenna," 2014 3rd Asia-Pacific Conference on Antennas and Propagation, 2014, pp. 130-133, IEEE, Harbin, China.

James P. Becker, et al., "Toward a Novel Planar Circuit Compatible Silicon Micromachined Waveguide," Electrical Engineering and Computer Science, The University of Michigan, 1999, pp. 221-224, IEEE, Ann Arbor, Michigan.

Machine translation prepared on Jan. 27, 2020, by the European Patent Office for Publication No. WO 2017208153.

* cited by examiner

HOLLOW METAL WAVEGUIDES HAVING IRREGULAR HEXAGONAL CROSS-SECTIONS AND METHODS OF FABRICATING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit under 35 U.S.C. § 119(e) of U.S. Provisional Patent Application No. 62/767,481 filed Nov. 14, 2018 and titled "HOLLOW METAL WAVEGUIDES HAVING IRREGULAR HEXAGONAL CROSS-SECTIONS AND METHOD OF FABRICATING SAME," which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

TECHNICAL FIELD

The disclosure relates generally to systems, methods, and devices related to a waveguide and its construction. A waveguide may be a structure that receives an electromagnetic wave, or signal, and which allows the electromagnetic wave to propagate through the waveguide with minimal energy loss. Waveguides may be used in a host of contexts, examples of which include antennas, electromagnetic filters, and other radio frequency (RF) components.

BACKGROUND

Antennas are ubiquitous in modern society and are becoming an increasingly important technology as smart devices multiply and wireless connectivity moves into exponentially more devices and platforms. An antenna structure designed for transmitting and receiving signals wirelessly between two points can be as simple as tuning a length of a wire to a known wavelength of a desired signal frequency. At a particular wavelength (which is inversely proportional to the frequency, as shown in the equation $\lambda=c/f$) for a particular length of wire, the wire will resonate in response to being exposed to the transmitted signal in a predictable manner that makes it possible to "read" or reconstruct a received signal. For simple devices, like radio and television, a wire antenna serves well enough.

Passive antenna structures are used in a variety of different applications. Communications is the most well-known application, and applies to areas such as radios, televisions, and internet. Radar is another common application for antennas, where the antenna, which can have a nearly equivalent passive radiating structure to a communications antenna, is used for sensing and detection. Common industries where radar antennas are employed include weather sensing, airport traffic control, naval vessel detection, and low earth orbit imaging. A wide variety of high-performance applications exist for antennas that are less known outside the industry, such as electronic warfare and ISR (information, surveillance, and reconnaissance) to name a couple.

High performance antennas are required when high data rate, long range, or high signal to noise ratios are required for a particular application. In order to improve the performance of an antenna to meet a set of system requirements, for example on a satellite communications (SATCOM) antenna, it is desirable to reduce the sources of loss and increase the amount of energy that is directed in a specific area away from the antenna (referred to as 'gain'). In the most challenging applications, high performance must be accomplished while also surviving demanding environmental, shock, and vibration requirements. Losses in an antenna structure can be due to a variety of sources: material properties (losses in dielectrics, conductivity in metals), total path length a signal must travel in the passive structure (total loss is loss per length multiplied by the total length), multi-piece fabrication, antenna geometry, and others. These losses are all related to specific design and fabrication choices that an antenna designer must make when balancing size, weight, power, and cost performance metrics (SWaP-C). Gain of an antenna structure is a function of the area of the antenna and the frequency of operation. To create a high gain antenna is to increase the total area with respect to the number of wavelengths, and poor choice of materials or fabrication method can rapidly reduce the achieved gain of the antenna by increasing the losses in the passive feed and radiating portions.

One of the lowest loss and highest performance RF structures is hollow metal waveguide. This is a structure that has a cross section of dielectric, air, or vacuum which is enclosed on the edges of the cross section by a conductive material, typically a metal like copper or aluminum. Typical cross sections for hollow metal waveguide include rectangles, squares, and circles, which have been selected due to the ease of analysis and fabrication in the $19^{th}$ and $20^{th}$ centuries. Air-filled hollow metal waveguide antennas and RF structures are used in the most demanding applications, such as reflector antenna feeds and antenna arrays. Reflector feeds and antenna arrays have the benefit of providing a very large antenna with respect to wavelength, and thus a high gain performance with low losses.

Every physical component is designed with the limitations of the fabrication method used to create the component. Antennas and RF components are particularly sensitive to fabrication method, as the majority of the critical features are inside the part, and very small changes in the geometry can lead to significant changes in antenna performance. Due to the limitations of traditional fabrication processes, hollow metal waveguide antennas and RF components have been designed so that the hollow metal waveguide antennas and RF components can be assembled as multi-piece assemblies, with a variety of flanges, interfaces, and seams. All of these joints where the structure is assembled together in a multi-piece fashion increase the size, weight, and part count of a final assembly while at the same time reducing performance through increased losses, path length, and reflections. This overall trend of increased size, weight, and part count with increased complexity of the structure have kept hollow metal waveguide antennas and RF components in the realm of applications where size, weight, and cost are less important than overall performance.

Accordingly, conventional waveguides have been manufactured using conventional subtractive manufacturing techniques which limit specific implementations for waveguides to the standard rectangular, square, and circular cross-sectional geometries that have the limitations described above. Additive manufacturing techniques provide opportunities, such as integrating waveguide structures with other RF components such that a plurality of RF components may be formed in a smaller physical device with improved overall performance. However, the process of fabricating a traditional rectangular, square, or circular waveguide structure in additive manufacturing typically leads to suboptimal performance and increased total cost in integrated waveguide structures. Novel cross-sections for waveguide structures that take advantage of the strengths of additive manufacturing will allow for improved performance of antennas and RF components while reducing total cost for a complex assembly.

It is therefore one object of this disclosure to provide waveguide structures that may be optimally fabricated with three dimensional printing techniques (aka additive manufacturing techniques). It is a further object of this disclosure to provide waveguide structures that include angle specific transitions in a waveguide structure. It is a further object of this disclosure to provide waveguide structures that are integral with other RF components.

SUMMARY OF THE DISCLOSURE

Disclosed herein is a waveguide which may be implemented as a hollow irregular hexagonal metal structure which receives an electromagnetic signal and propagates the signal through the hollow hexagonal metal structure. The waveguide may be fabricated using metal additive manufacturing techniques and include one or more unsupported downward facing surfaces.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION OF THE DISCLOSURE

Figure 1:
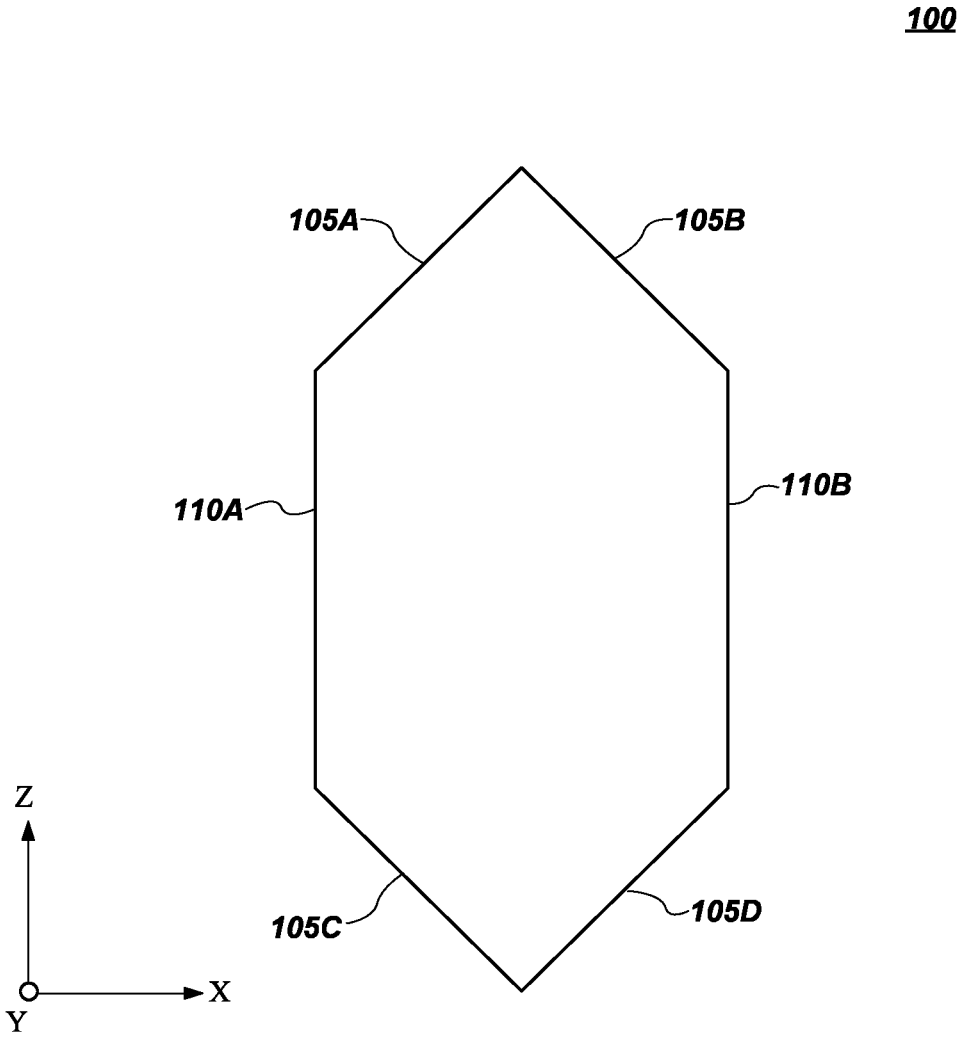
FIG. 1 illustrates an embodiment of a cross section of an irregular hexagonal waveguide.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Before the structure, systems, and methods for integrated marketing are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

It is also noted that many of the figures discussed herein show air volumes of various implementations of waveguides, waveguide components, and/or waveguide transitions. In other words, these air volumes illustrate negative spaces of the components within a fabricated element which are created by a metal skin installed in the fabricated element, as appropriate to implement the functionality described. It is to be understood that positive structures that create the negative space shown by the various air volumes are disclosed by the air volumes, the positive structures including a metal skin and being formed using the additive manufacturing techniques disclosed herein.

For the purposes of this description as it relates to a metal additive manufacturing system, the direction of growth over time is called the positive z-axis, or "zenith" while the opposite direction is the negative z-axis or "nadir." The nadir direction is sometimes referred to as "downward" although the orientation of the z-axis relative to gravity makes no difference in the context of this invention. The direction of a surface at any given point is denoted by a vector that is normal to that surface at that point. The angle between that vector and the negative z-axis is the "overhang angle," θ ("theta").

The term "downward facing surface" is any non-vertical surface of an object being fabricated in a metal additive manufacturing process that has an overhang angle, θ, measured between two vectors originating from any single point on the surface. The two vectors are: (1) a vector perpendicular to the surface and pointing into the air volume and (2) a vector pointing in the nadir (negative z-axis, opposite of the build, or zenith) direction. An overhang angle, θ, for a downward facing surface will generally fall within the range: $0° \leq \theta < 90°$. Overhang angles, θ, for downward facing surfaces are illustrated in various embodiments of hollow metal waveguides, as further described below. As used herein, downward facing surfaces are unsupported by removable support structures from within a waveguide during fabrication, for example, which means that no internal bracing exists within a cavity of a waveguide for supporting downward facing surfaces or build walls.

FIG. 1 illustrates an embodiment of a cross section of an irregular hexagonal waveguide 100. Waveguide 100 includes a plurality of sides. As shown in FIG. 1, waveguide 100 includes a first side 105A and a second side 105B which are symmetric with identical lengths. Waveguide 100 further includes a third side 105C and a fourth side 105D which are also symmetric with identical lengths. As shown in FIG. 1, each of sides 105A-105D are symmetric with identical lengths. However, as will be discussed in more detail below, sides 105A-105D need not be symmetric or have identical lengths. Each of sides 105A-105D may have different lengths or some of sides 105A-105D may have similar lengths while others of sides 105A-105D may have different lengths.

Waveguide 100 is referred to as an irregular hexagon because fifth side 110A and sixth side 110B have a length that is different from sides 105A-105D. As shown in FIG. 1, fifth side 110A and sixth side 110B have a same length that is longer than a length of sides 105A-105D. Although, it is conceivable, that fifth side 110A and sixth side 110B may have a length that is the same as or shorter than a length of sides 105A-105D. It should be noted that in the special case where fifth side 110A and sixth side 110B have a length that is the same as a length of sides 105A-105D, waveguide 100 may be a regular hexagonal waveguide. The term "hexagonal" as used herein, may include both irregular or regular hexagonal waveguides while the term "irregular hexagon" or "regular hexagon" excludes a regular hexagon or irregular hexagon, respectively.

Waveguide 100 has many advantages over conventional waveguides. First, waveguide 100 may provide suitable electrical characteristics for receiving a signal of comparable frequency, power, transmission loss, and other electrical characteristics as, for example, conventional rectangular waveguides. However, waveguide 100 may be more easily created using metal additive manufacturing processes (e.g., 3D metal printing) than, for example, conventional rectangular waveguides.

Metal additive manufacturing is a fabrication method that allows for complex integrated structures to be fabricated as a single part. However, one unique aspect of metal additive manufacturing, is that these complex integrated structures are fabricated as layers laid on top of other layers of metal. Thus, orientation, or printing order, of specific parts or pieces must be considered to ensure that a hollow metal waveguide, or other structure, may be formed within an integrated structure without additional build support within the waveguide. In other words, during metal additive manufacturing, only a first layer of metal may be printed without having another layer underneath the first layer preferably in a positive Z-direction (e.g., from approximately 0° to approximately 90° to the X-Y plane where the Y direction extends perpendicular to the X-Z plane shown in FIG. 1). This is possible by printing onto a metal build plate to support the build of a structure in, preferably, a positive Z-direction in a typical metal additive manufacturing build process. Further, another constraint of metal additive manufacturing is that a metal layer must be printed on another layer of metal (or build substrate in the case of the first metal layer). In one example, a rectangular waveguide may have four sides, a bottom, two vertical sides, and a top. Printing a rectangular waveguide, however, presents difficulties because, while the bottom and vertical sides may be easily printed, the top side of the rectangular waveguide must be printed without a layer of material underneath it. Thus, any new layer has no metal layer on which to print a top side of the rectangular waveguide. In order to print a top surface, at least some overhang from a previous layer, must extend, at least on a micron level, across a gap between the vertical sides of the rectangular waveguide in order to eventually join the vertical sides with a top side. While some overhang can be tolerated, an overhang of 0°, or a right-angle, as in a rectangular waveguide, typically leads to mechanical defects or requires internal support structures to fabricate.

An overhang generated during the layering of an additive manufacturing fabrication at transitions with angles at or near 0° can produce significant mechanical defects. Such an overhang tends to occur at locations where one or more sides of the component being manufactured encounters a significant transition (e.g., an angle approaching 0°) in the build direction. Therefore, it is desirable to maintain the angles between different surfaces within a prescribed range of 45°+/−25° through selective component shaping and build orientation during manufacturing. Waveguide 100 provides a waveguide with angles that have more moderate transition angles 13 between each one of sides 105A-105D and with fifth side 110A and sixth side 110B. It is noted that third side 105C and fourth side 105D may be supported by metal and only first side 105A and second side 105B are considered to be overhanging sides, as will be discussed below.

Waveguide 100, and other waveguides disclosed herein, may include short wall edges that may be chamfered with a 45°±25° angle applied to what would originally have been a sharp point, as will be shown and discussed below. This edge chamfering allows for a build orientation of a waveguide structure optimally suited for fabrication with metal additive manufacturing by minimizing overhangs and maintaining an optimum angle for surface roughness.

In some embodiments, print orientation of the various embodiments of waveguides disclosed herein is generally along the positive z-axis direction, which is a presently preferred orientation for the waveguides and which also tends to minimizes overhang. As such, an irregular hexagonal-shaped cross-section of waveguide 100 is a useful geometry for both the electrical characteristics required for a waveguide, but also for printing by additive manufacturing techniques. Waveguide 100 minimizes build volume of more complex waveguide assemblies while also reducing overhang issues by keeping critical overhang angles controlled to 45°±25°. For example, short walls are chamfered on each corner by a nominal 45° angle such that waveguide 100 comes to a point between any of sides 105A-105D and sides 110A-110B. As will be discussed below, other embodiments, such as single-ridged and dual-ridged waveguide embodiments, discussed below, allow for broader bandwidth structures that have optimal geometry for metal additive manufacturing fabrication methods. Symmetry of waveguide 100 (chamfers on upper and lower edge) may be employed for improved RF performance and routing. In some embodiments, waveguide 100 may bend/tilt slightly along the axis of extrusion to allow for better fabrication, as will be discussed below.

Figure 2:
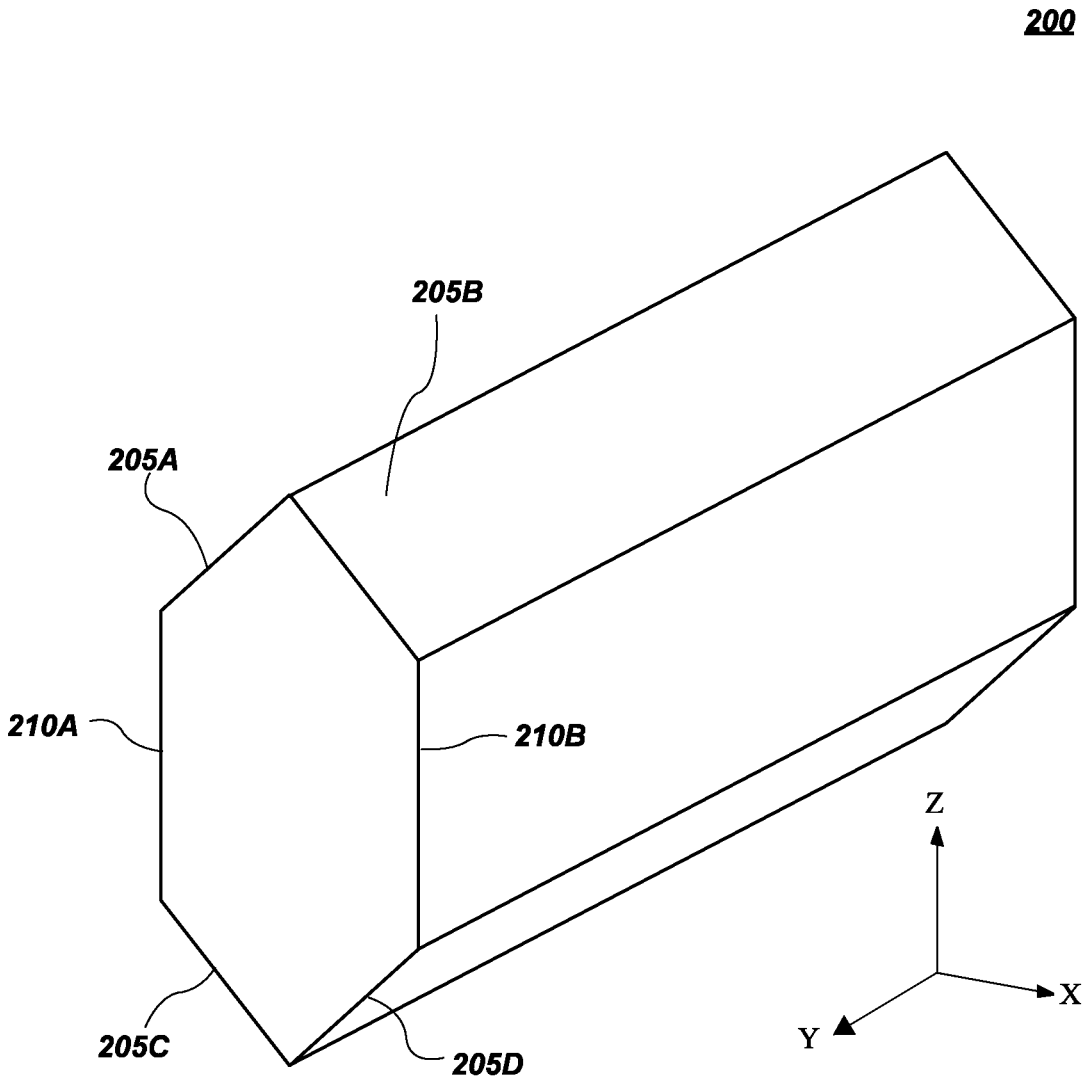
FIG. 2 illustrates a perspective view of an air volume of an irregular hexagonal waveguide.

FIG. 2 illustrates a perspective view of an air volume of an irregular hexagonal waveguide 200. Waveguide 200 may include a cross section of waveguide 100, shown in FIG. 1 and discussed above, although FIG. 2 of waveguide 200 also shows a depth of waveguide 200 in a Y direction. As shown in FIG. 2, waveguide 200 includes a first side 205A and a second side 205B which are symmetric with identical lengths. Waveguide 200 further includes a third side 205C and a fourth side 205D which are also symmetric with identical lengths. As shown in FIG. 2, each of sides 205A-205D are symmetric with identical lengths. However, as will be discussed in more detail below, sides 205A-205D need not be symmetric or have identical lengths. Each of sides 205A-205D may have different lengths or some of sides 205A-205D may have similar lengths while others of sides 205A-205D may have different lengths.

Waveguide 200 is referred to as an irregular hexagon because fifth side 210A and sixth side 210B have a length that is different from sides 205A-205D. As shown in FIG. 2, fifth side 210A and sixth side 210B have a same length that is longer than a length of sides 205A-205D. Although, it is conceivable, that fifth side 210A and sixth side 210B may have a length that is the same as or shorter than a length of sides 205A-205D. It should be noted that in the special case where fifth side 210A and sixth side 210B have a length that is the same as a length of sides 205A-205D, waveguide 200 may be a regular hexagonal waveguide.

Figure 3:
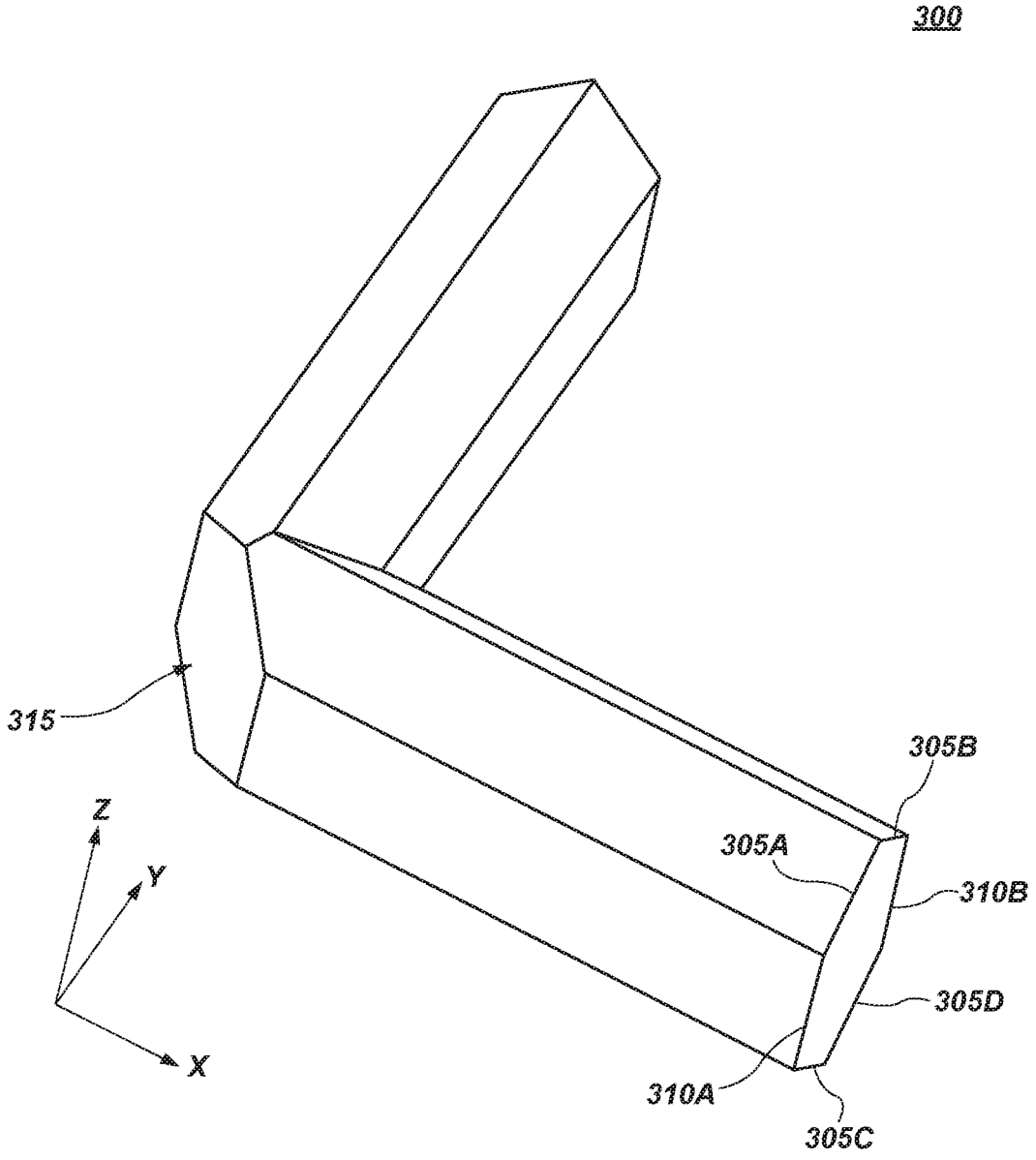
FIG. 3 illustrates a perspective view of an embodiment of an air volume of an irregular hexagonal waveguide with a 90° sharp E-plane bend.

FIG. 3 illustrates a perspective view of an embodiment of an air volume of an irregular hexagonal waveguide with a 90° sharp E-plane bend 300. Bend 300 may be a waveguide that includes a plurality of sides. For example, bend 300 includes a first side 305A and a second side 305B which are symmetric with identical lengths. Bend 300 further includes a third side 305C and a fourth side 305D which are also symmetric with identical lengths. As shown in FIG. 3, each of sides 305A-305D are symmetric with identical lengths. However, as will be discussed in more detail below, sides 305A-305D need not be symmetric or have identical lengths. Each of sides 305A-305D may have different lengths or some of sides 305A-305D may have similar lengths while others of sides 305A-305D may have different lengths.

Bend 300 is referred to as an irregular hexagon because fifth side 310A and sixth side 310B have a length that is different from sides 305A-305D. As shown in FIG. 3, fifth side 310A and sixth side 310B have a same length that is longer than a length of sides 305A-305D. Although, it is conceivable, that fifth side 310A and sixth side 310B may have a length that is the same as or shorter than a length of sides 305A-305D. It should be noted that in the special case where fifth side 310A and sixth side 310B have a length that is the same as a length of sides 305A-305D, bend 300 may be a regular hexagonal waveguide.

As shown in FIG. 3, bend 300 is a waveguide that provides a 90° sharp E-plane bend which refers to a direction of propagation for an electromagnetic wave (perpendicular to the H-plane, for example). Bend 300 includes an irregularly or regularly hexagonal chamfer 315 depending on the relative lengths of sides 305A-305D and 310A-310B. Chamfer 315 provides a surface that allows a wave propagating through bend 300 to change direction by 90° by providing the appropriate impedance transition for the waveguide mode with chamfer 315.

Figure 4:
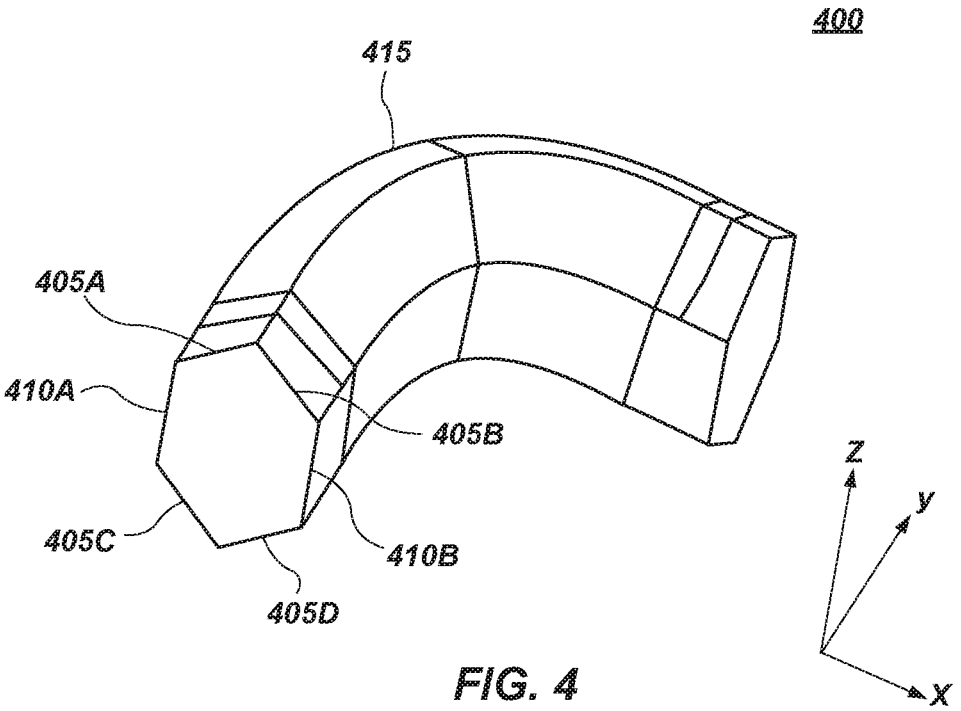
FIG. 4 illustrates a perspective view of an embodiment of an air volume of an irregular hexagonal waveguide with a 90° smooth E-plane bend.

FIG. 4 illustrates a perspective view of an embodiment of an air volume of an irregular hexagonal waveguide with a 90° smooth E-plane bend 400. Bend 400 may be a waveguide that includes a plurality of sides. For example, bend 400 includes a first side 405A and a second side 405B which are symmetric with identical lengths. Bend 400 further includes a third side 405C and a fourth side 405D which are also symmetric with identical lengths. As shown in FIG. 4, each of sides 405A-405D are symmetric with identical lengths. However, as will be discussed in more detail below, sides 405A-405D need not be symmetric or have identical lengths. Each of sides 405A-405D may have different lengths or some of sides 405A-405D may have similar lengths while others of sides 405A-405D may have different lengths.

Bend 400 is referred to as an irregular hexagon because fifth side 410A and sixth side 410B have a length that is different from sides 405A-405D. As shown in FIG. 4, fifth side 410A and sixth side 410B have a same length that is longer than a length of sides 405A-405D. Although, it is conceivable, that fifth side 410A and sixth side 410B may have a length that is the same as or shorter than a length of sides 405A-405D. It should be noted that in the special case where fifth side 410A and sixth side 410B have a length that is the same as a length of sides 405A-405D, bend 400 may be a regular hexagonal waveguide.

As shown in FIG. 4, bend 400 is a waveguide that provides a 90° smooth E-plane bend which refers to a direction of propagation for an electromagnetic wave (perpendicular to the H-plane, for example). Bend 400 may be implemented with a successively angled transition 415 which changes a direction of an electromagnetic wave by 90°. Bend 400 provides the same function as a chamfer 315, shown in FIG. 3, by simply extending sides 405A-405D and 410A-410B around successively angled transition 415. However, bend 400 may be more useful in some circumstances than bend 300, shown in FIG. 3.

Figure 5:
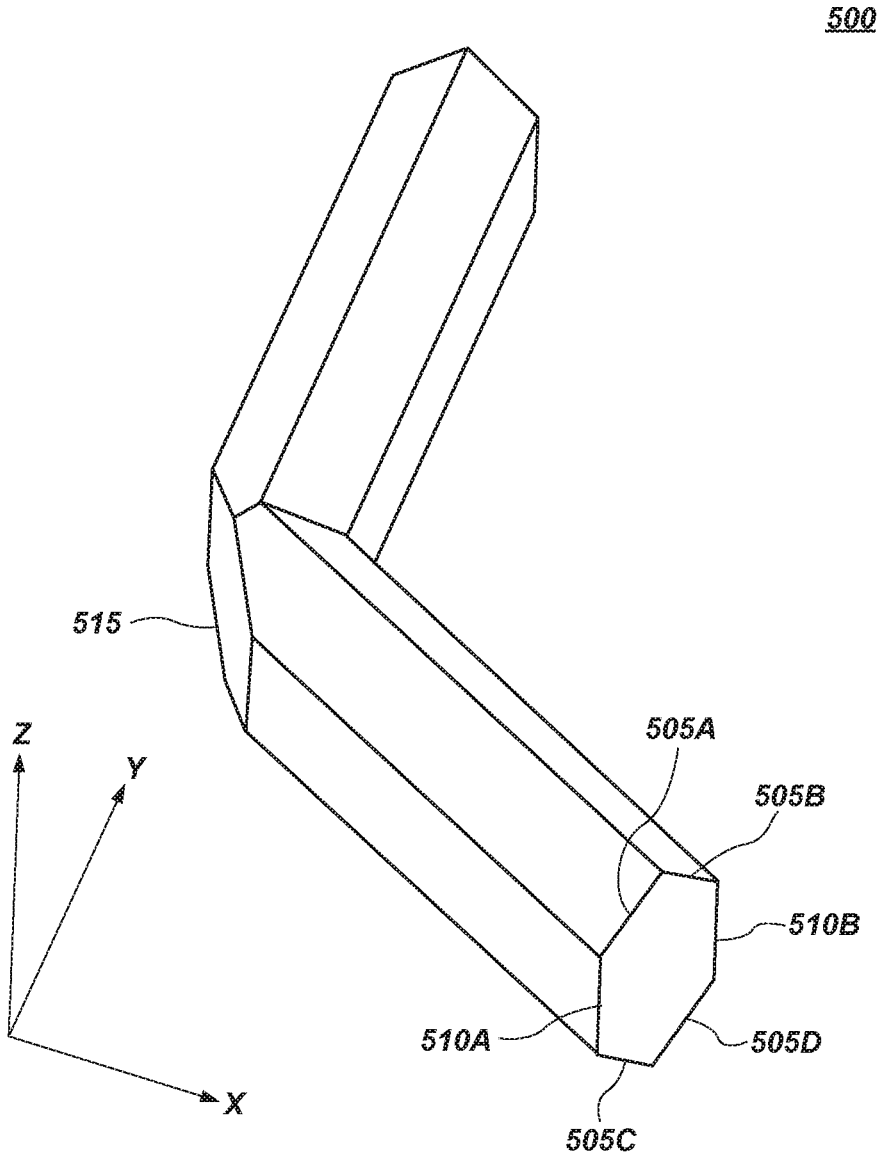
FIG. 5 illustrates a perspective view of an embodiment of an air volume of an irregular hexagonal waveguide with an obtuse angle sharp E-plane bend.

FIG. 5 illustrates a perspective view of an embodiment of an air volume of an irregular hexagonal waveguide with an obtuse angle sharp E-plane bend 500. Bend 500 may be a waveguide that includes a plurality of sides. For example, bend 500 includes a first side 505A and a second side 505B which are symmetric with identical lengths. Bend 500 further includes a third side 505C and a fourth side 505D which are also symmetric with identical lengths. As shown in FIG. 5, each of sides 505A-505D are symmetric with identical lengths. However, as will be discussed in more detail below, sides 505A-505D need not be symmetric or have identical lengths. Each of sides 505A-505D may have different lengths or some of sides 505A-505D may have similar lengths while others of sides 505A-505D may have different lengths.

Bend 500 is referred to as an irregular hexagon because fifth side 510A and sixth side 510B have a length that is different from sides 505A-505D. As shown in FIG. 5, fifth side 510A and sixth side 510B have a same length that is longer than a length of sides 505A-505D. Although, it is conceivable, that fifth side 510A and sixth side 510B may have a length that is the same as or shorter than a length of sides 505A-505D. It should be noted that in the special case where fifth side 510A and sixth side 510B have a length that is the same as a length of sides 505A-505D, bend 500 may be a regular hexagonal waveguide.

As shown in FIG. 5, bend 500 is a waveguide that provides an obtuse angle E-plane bend. In other words, bend 500 has an angle of greater than 90°. Bend 500 includes an irregularly or regularly hexagonal chamfer 515 depending on the relative lengths of sides 505A-505D and 510A-510B. Chamfer 515 provides a surface that allows a wave propagating through bend 500 to change direction by an obtuse angle by providing the appropriate impedance transition for the waveguide mode with chamfer 515. As shown in FIG. 5, bend 500 may be set at a tilted inclination along a length of bend 500. That is, a particular cross section of bend 500 may be slightly offset from a previous or subsequent cross section along the length of bend 500 to facilitate fabrication requirements.

Figure 6:
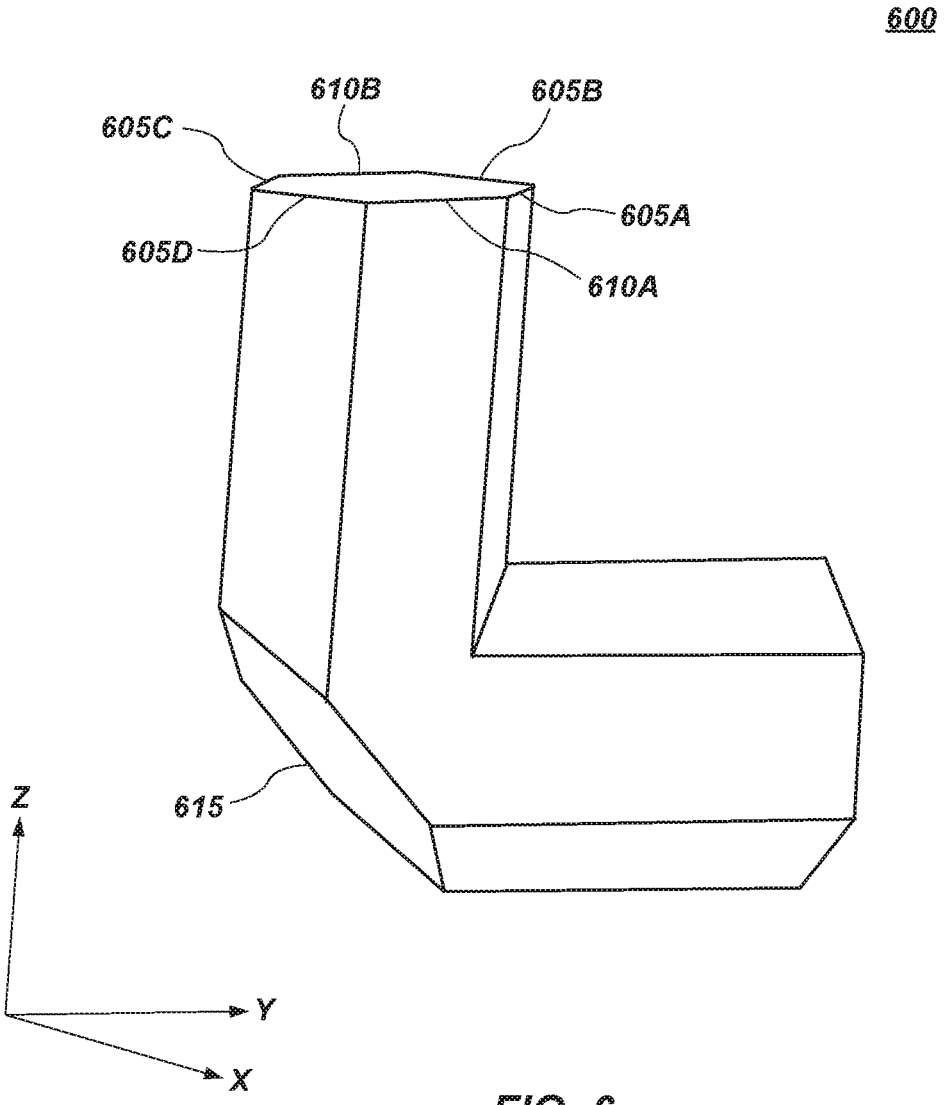
FIG. 6 illustrates a perspective view of an embodiment of an air volume of an irregular hexagonal waveguide with a 90° H-plane bend.

FIG. 6 illustrates a perspective view of an embodiment of an air volume of an irregular hexagonal waveguide with a 90° H-plane bend 600. Bend 600 may be a waveguide that includes a plurality of sides. For example, bend 600 includes a first side 605A and a second side 605B which are symmetric with identical lengths. Bend 600 further includes a third side 605C and a fourth side 605D which are also symmetric with identical lengths. As shown in FIG. 6, each of sides 605A-605D are symmetric with identical lengths. However, as will be discussed in more detail below, sides 605A-605D need not be symmetric or have identical lengths. Each of sides 605A-605D may have different lengths or some of sides 605A-605D may have similar lengths while others of sides 605A-605D may have different lengths.

Bend 600 is referred to as an irregular hexagon because fifth side 610A and sixth side 610B have a length that is different from sides 605A-605D. As shown in FIG. 6, fifth side 610A and sixth side 610B have a same length that is longer than a length of sides 605A-605D. Although, it is conceivable, that fifth side 610A and sixth side 610B may have a length that is the same as or shorter than a length of sides 605A-605D. It should be noted that in the special case where fifth side 610A and sixth side 610B have a length that is the same as a length of sides 605A-605D, bend 600 may be a regular hexagonal waveguide.

As shown in FIG. 6, bend 600 is a waveguide that provides a 90° H-plane bend. Bend 600 includes a chamfer 615 which provides a surface that allows a wave propagating through bend 600 to change direction by 90° by providing the appropriate impedance transition for the waveguide mode with chamfer 615. As shown in FIG. 6, bend 600 may be set at a tilted inclination along a length of bend 600. That is, a particular cross section of bend 600 may be slightly offset from a previous or subsequent cross section along the length of bend 600 to facilitate fabrication requirements.

Figure 7:
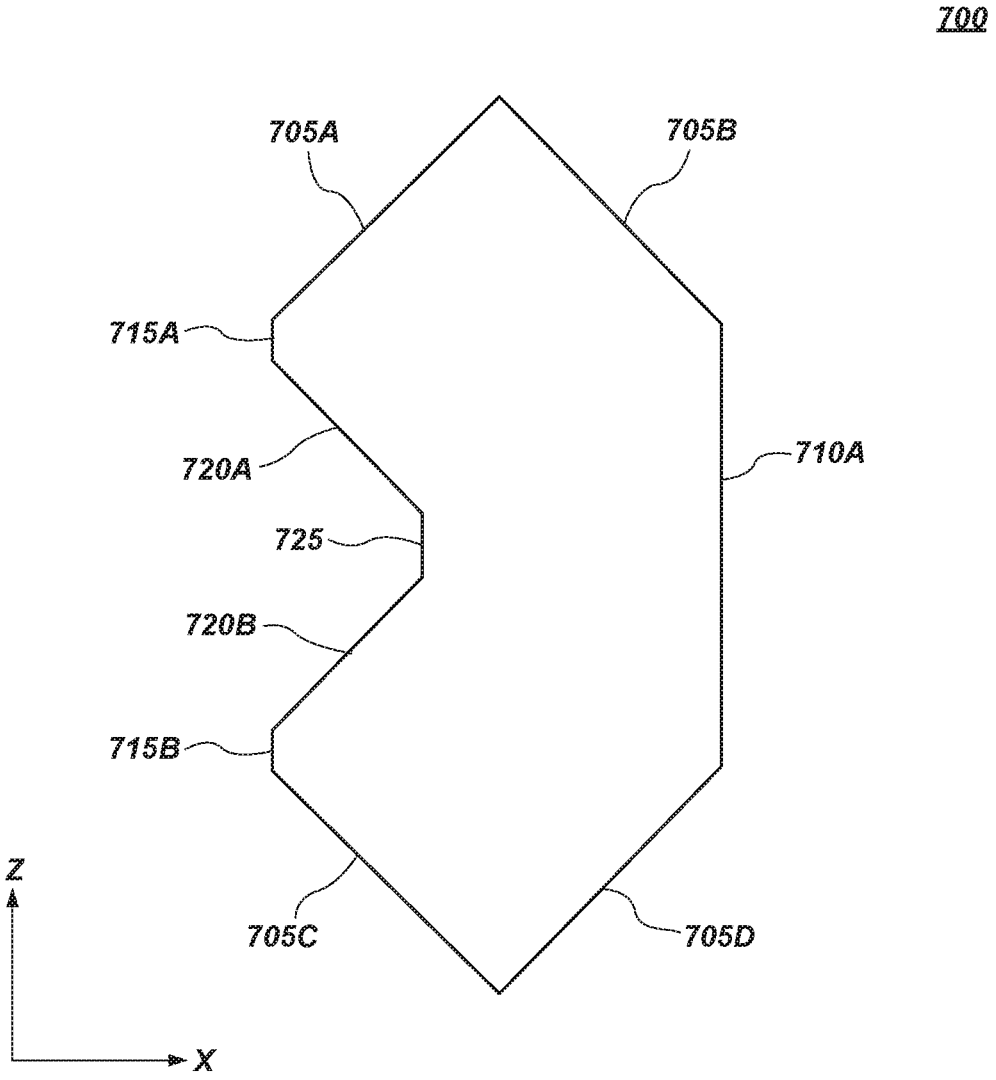
FIG. 7 illustrates an embodiment of a cross section of an irregular hexagonal waveguide having a complex irregular side.

FIG. 7 illustrates an embodiment of a cross section of an irregular hexagonal waveguide 700 having a complex irregular side. Waveguide 700 includes a plurality of sides. As shown in FIG. 7, waveguide 700 includes a first side 705A and a second side 705B which are symmetric with identical lengths. Waveguide 700 further includes a third side 705C and a fourth side 705D which are also symmetric with identical lengths. As shown in FIG. 7, each of sides 705A-705D are symmetric with identical lengths. However, as will be discussed in more detail below, sides 705A-705D need not be symmetric or have identical lengths. Each of sides 705A-705D may have different lengths or some of sides 705A-705D may have similar lengths while others of sides 705A-705D may have different lengths.

Waveguide 700 is referred to as an irregular hexagon with a complex side because a fifth side of waveguide 700, which is a complex side, and sixth side 710A both have a length that is different from sides 705A-705D. Waveguide 700 includes a complex side identified between first side 705A and third side 705C, as shown in FIG. 7. The complex side includes two vertical sides 715A and 715B to facilitate printing orientation to accommodate a chamfer with two symmetrical sides 720A and 720B which are joined at a third vertical side 725. More simply, a side of an irregular hexagonal waveguide, such side 110A of waveguide 100 shown in FIG. 1, is formed as being concave into waveguide 700, as shown in FIG. 7, with three vertical sides 715A, 715B, and 725 that facilitate an angle of transition between first side 705A, vertical side 725, and third side 705C that is suitable for printing. Accordingly, waveguide 700 may be termed a "complex single-ridged waveguide" which provides additional bandwidth capability over that provided by waveguide 100, shown in FIG. 1. Waveguide 700 includes more than six sides as the term "hexagon" may imply. However, the complex sides of waveguide 700 may be considered a single side with additional complex angles that facilitate a chamfer created by chamfers 720A and 720B. Accordingly, waveguide 700 may be referred to as a hexagonal waveguide, having a plurality of sides.

Figure 8:
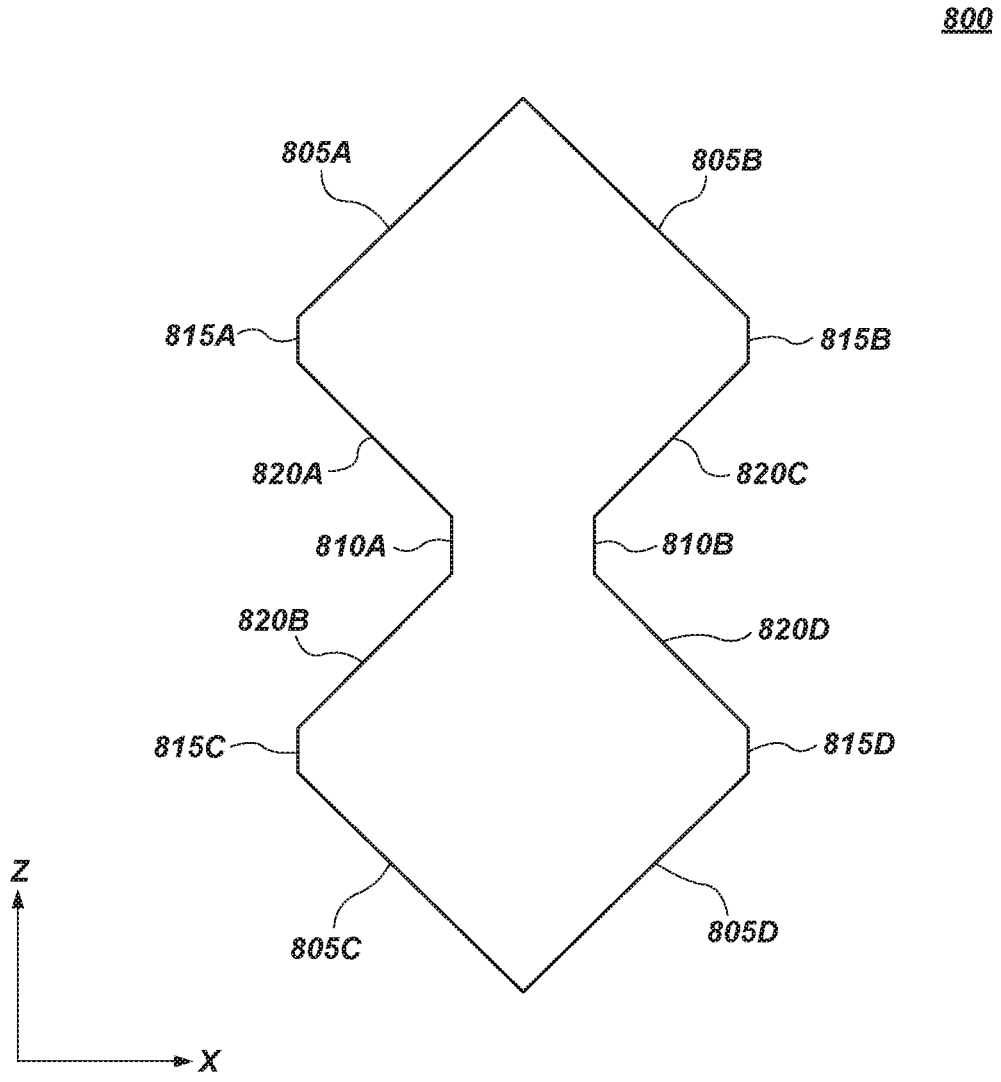
FIG. 8 illustrates an embodiment of a cross section of an irregular hexagonal waveguide having two complex irregular sides.

FIG. 8 illustrates an embodiment of a cross section of an irregular hexagonal waveguide 800 having two complex irregular sides. Waveguide 800 includes a plurality of sides. As shown in FIG. 8, waveguide 800 includes a first side 805A and a second side 805B which are symmetric with identical lengths. Waveguide 800 further includes a third side 805C and a fourth side 805D which are also symmetric with identical lengths. As shown in FIG. 8, each of sides 805A-805D are symmetric with identical lengths. However, as will be discussed in more detail below, sides 805A-805D need not be symmetric or have identical lengths. Each of sides 805A-805D may have different lengths or some of sides 805A-805D may have similar lengths while others of sides 805A-805D may have different lengths.

Waveguide 800 includes two complex sides, as described below. For example, waveguide 800 includes a first side 805A, a second side 805B, a third side 805C, and a fourth side 805D. Complex sides may be identified between first side 805A and third side 805C and second side 805B and fourth side 805D, respectively, as shown in FIG. 8. A first complex side of waveguide 800 includes two vertical sides 815A and 815C to facilitate printing orientation and includes a chamfer implemented by two symmetrical sides 820A and 820B which are joined at a third vertical side 810A. A second complex side of waveguide 800 includes two vertical sides 815B and 815D to facilitate printing orientation, as described above, and includes a second chamfer implemented by two symmetrical sides 820C and 820D which are joined at a third vertical side 810B. More simply, two sides of an irregular hexagonal waveguide, such sides 110A and 110B of waveguide 100 shown in FIG. 1, are formed as being concave into waveguide 800, as shown in FIG. 8, with three vertical sides per complex side 815A, 815C, and 810A on one complex side and vertical side 815B, 815D, and 810B that facilitate an angle of transition in each complex side of waveguide 800. Accordingly, waveguide 800 may be termed a "complex double-ridged waveguide" which provides additional bandwidth capability over that provided by waveguide 100, shown in FIG. 1. Waveguide 800 includes more than six sides as the term "hexagon" may imply. However, the complex sides of waveguide 800 may be considered a single side with additional complex angles that facilitate a chamfer created by chamfers 820A and 820B and 820C and 820D. Accordingly, waveguide 800 may be referred to as a hexagonal waveguide, having a plurality of sides.

Figure 9:
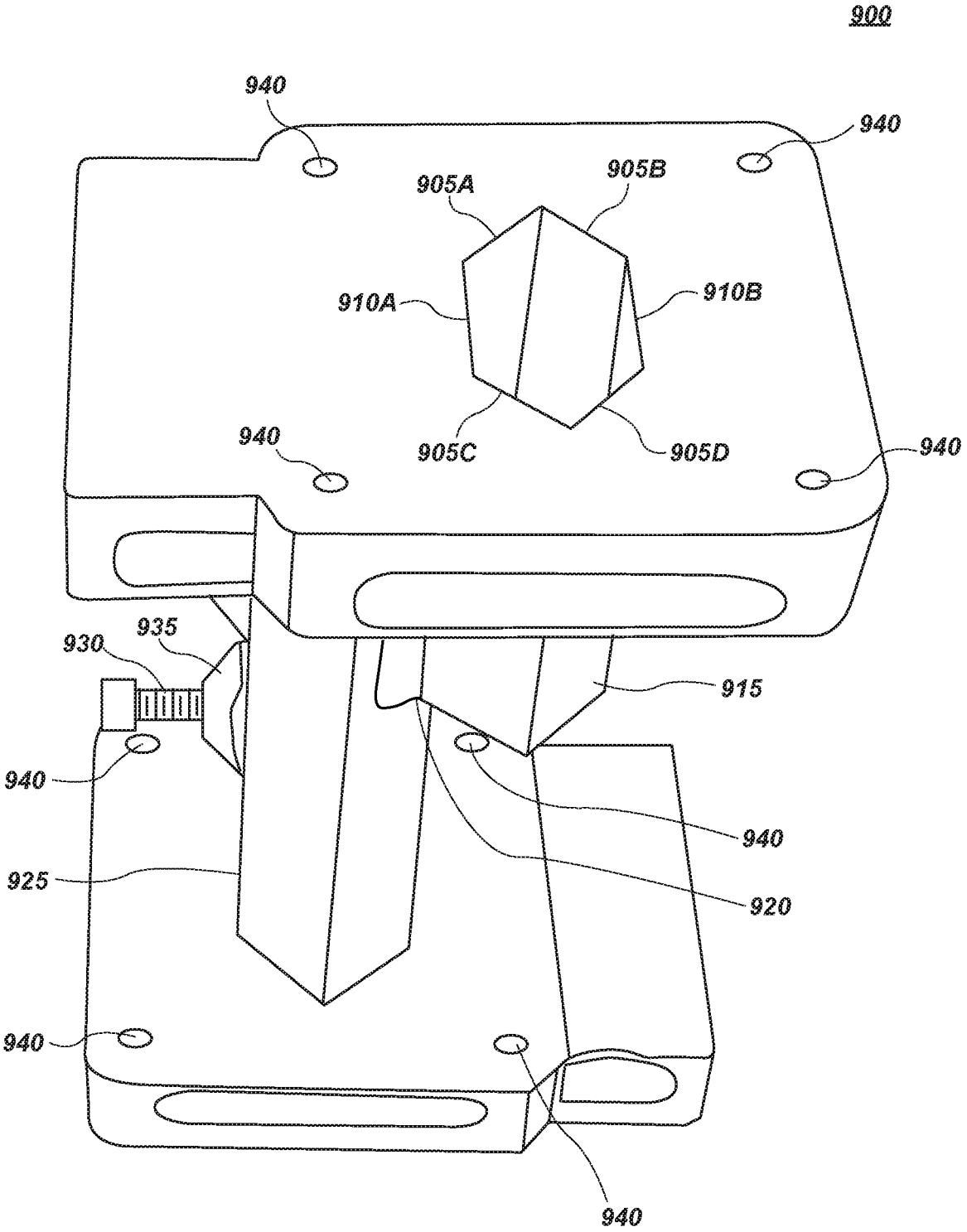
FIG. 9 illustrates an embodiment of a fabricated waveguide component illustrating the irregular hexagonal waveguide.

FIG. 9 illustrates an embodiment of a fabricated waveguide component 900 illustrating the irregular hexagonal waveguide. Component 900 may be an exemplary physical manifestation of a waveguide, such as waveguide 100, shown in FIG. 1. Accordingly, component 900 includes a waveguide having a plurality of sides. Waveguide 915 includes a first side 905A and a second side 905B which are symmetric with identical lengths. Waveguide 915 further includes a third side 905C and a fourth side 905D which are also symmetric with identical lengths. As shown in FIG. 9, each of sides 905A-905D are symmetric with identical lengths. However, as will be discussed in more detail below, sides 905A-905D need not be symmetric or have identical lengths. Each of sides 905A-905D may have different lengths or some of sides 905A-905D may have similar lengths while others of sides 905A-905D may have different lengths.

Waveguide 915 is referred to as an irregular hexagon because fifth side 910A and sixth side 910B have a length that is different from sides 905A-905D. As shown in FIG. 9, fifth side 910A and sixth side 910B have a same length that is longer than a length of sides 905A-905D. Although, it is conceivable, that fifth side 910A and sixth side 910B may have a length that is the same as or shorter than a length of sides 905A-905D.

As shown in FIG. 9, waveguide 915 may be connected to waveguide 925 at junction 920 to alter the electrical characteristics of waveguide 915. For example, waveguide 925 may provide additional bandwidth over what waveguide 915 may support or, alternatively, waveguide 915 and waveguide 925 may act together as at least a portion of an RF power splitter in other embodiments, or as an RF filter in other embodiments. Waveguide 915 and waveguide 925 may be provided with a tuning screw 930 which may serve to tune at least some characteristics of waveguides 915 and 925 through tuning port 935.

Component 900 may be integrally fashioned as a constituent element of, for example, an integrated antenna array. However, as shown in FIG. 9, component 900 is fitted with a plurality of mounting holes 940 which allow component 900 to be fixedly attached to another RF element, for example. In such an example, a radiating element may receive an electromagnetic signal which is propagated by a waveguide bolted into waveguide 915 by mounting holes 940 where a frequency filter is applied at junction 920 between waveguide 915 and 925. Waveguide 925 may output the filtered electromagnetic signal to a bolted on receiver via mounting holes 940 which may then interpret and process the electromagnetic signal. Other exemplary components may be used and attached to component 900 via mounting holes 940. In other embodiments, waveguide 915 and 925 may be implemented with any of bends 300-700 shown in FIGS. 3-7, respectively to allow various components to be connected to each other in a single physical component that includes an entire chain of RF components.

Figure 10:
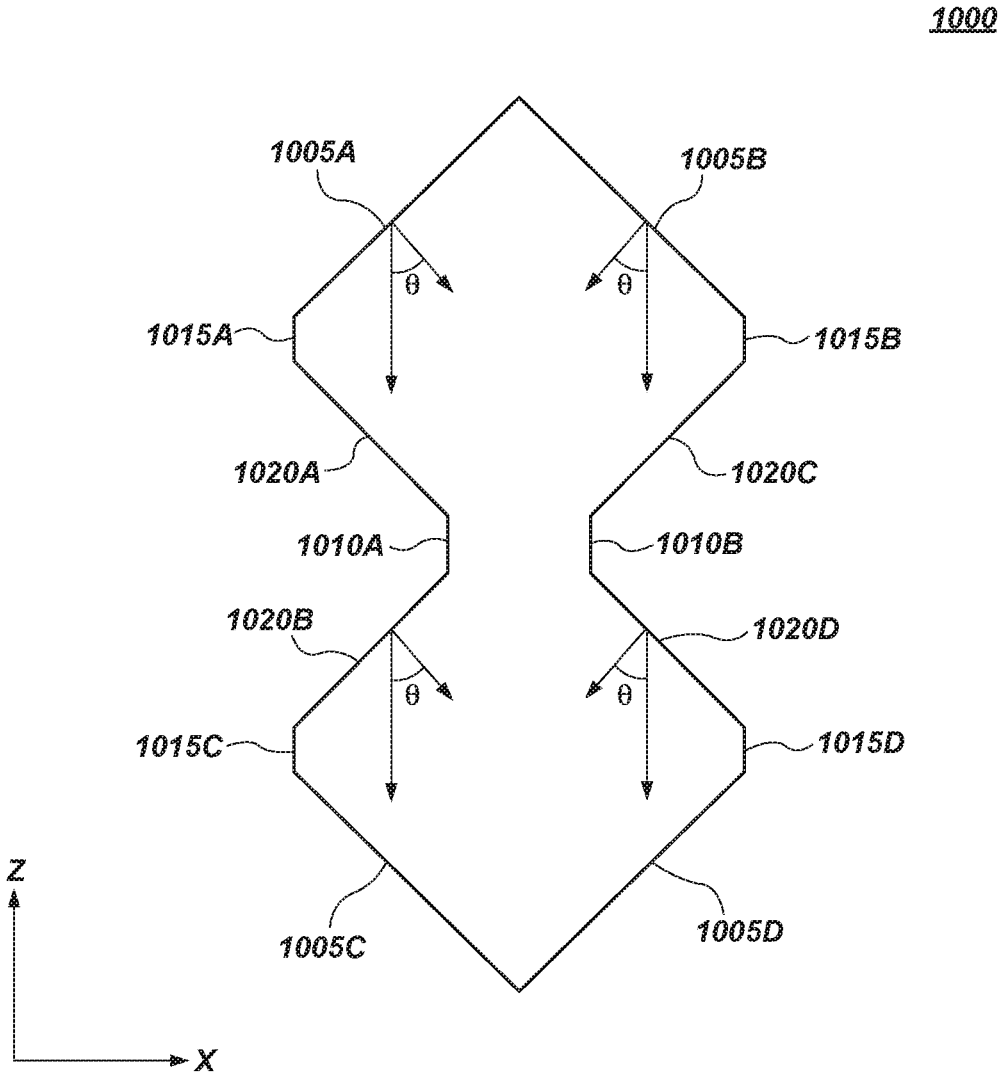
FIG. 10 illustrates a cross section of an irregular hexagonal waveguide having two complex irregular sides showing an overhang angle θ of nominally 45° between surface normal and the nadir or negative z-axis vector for all downward facing surfaces.

FIG. 10 illustrates a cross section of an irregular hexagonal waveguide 1000 having two complex irregular sides showing an overhang angle θ of nominally 45° between surface normal and the nadir or negative z-axis vector for all downward facing surfaces. Waveguide 1000 may be similar to waveguide 800, shown in FIG. 8, and include a plurality of sides. As shown in FIG. 10, waveguide 1000 includes a first side 1005A and a second side 1005B which are symmetric with identical lengths. Waveguide 1000 further includes a third side 1005C and a fourth side 1005D which are also symmetric with identical lengths. As shown in FIG. 10, each of sides 1005A-1005D are symmetric with identical lengths. However, as will be discussed in more detail below, sides 1005A-1005D need not be symmetric or have identical lengths. Each of sides 1005A-1005D may have different lengths or some of sides 1005A-1005D may have similar lengths while others of sides 1005A-1005D may have different lengths.

Waveguide 1000 includes two complex sides, as described below. For example, waveguide 1000 includes a first side 1005A, a second side 1005B, a third side 1005C, and a fourth side 1005D. Complex sides may be identified between first side 1005A and third side 1005C and second side 1005B and fourth side 1005D, respectively, as shown in FIG. 10. A first complex side of waveguide 1000 includes two vertical sides 1015A and 1015C to facilitate printing orientation, as described above, and includes a chamfer implemented by two symmetrical sides 1020A and 1020B which are joined at a third vertical side 1010A. A second complex side of waveguide 1000 includes two vertical walls 1015B and 1015D to facilitate printing orientation, as described above, and includes a chamfer implemented by two symmetrical sides 1020C and 1020D which are joined at a third vertical wall 1010B. More simply, two sides of an irregular hexagonal waveguide, such as sides 110A and 110B of waveguide 100 shown in FIG. 1, are formed as being concave into waveguide 1000, as shown in FIG. 10, with three vertical sides per complex side 1015A, 1015C, and 1010A on one complex side and vertical sides 1015B, 1015D, and 1010B on a second complex side. Accordingly, waveguide 1000 may be termed a "complex double-ridged waveguide" which provides additional bandwidth capability over that provided by waveguide 100, shown in FIG. 1. Waveguide 1000 includes more than six sides as the term "hexagon" may imply. However, the complex sides of waveguide 1000 may be considered a single side with additional complex angles. Accordingly, waveguide 1000 may be referred to as a hexagonal waveguide, having a plurality of sides.

FIG. 10 further illustrates an overhang angle θ of nominally 45° between surface normal and the nadir or negative z-axis vector for all downward facing surfaces, such as first side 1005A, second side 1005B, third side 1020B, and fourth side 1020D. For example, by maintaining an overhang angle θ of approximately 45°, within 25°, waveguide 1000 may be printed with much higher fidelity in an additive manufacturing process. For example, since a waveguide made by an additive manufacturing process is effectively three dimensionally printed with one layer on top of a previous layer, each downward facing surface, such as first side 1005A, second side 1005B, third side 1020B, and fourth side 1020D must be supported by a previous printed layer. Maintaining an overhang angle θ of approximately 45°, within 25°, ensures that enough material has been deposited on a previous layer for a subsequent layer to be fully supported. In this manner, subsequent layers may overhang a previous layer until a downward facing surface is fully printed and supported by nothing more than previous layers of material. Accordingly, waveguide 1000 provides excellent bandwidth and other electrical characteristics while also being fully printable through an additive manufacturing process.

Figure 11:
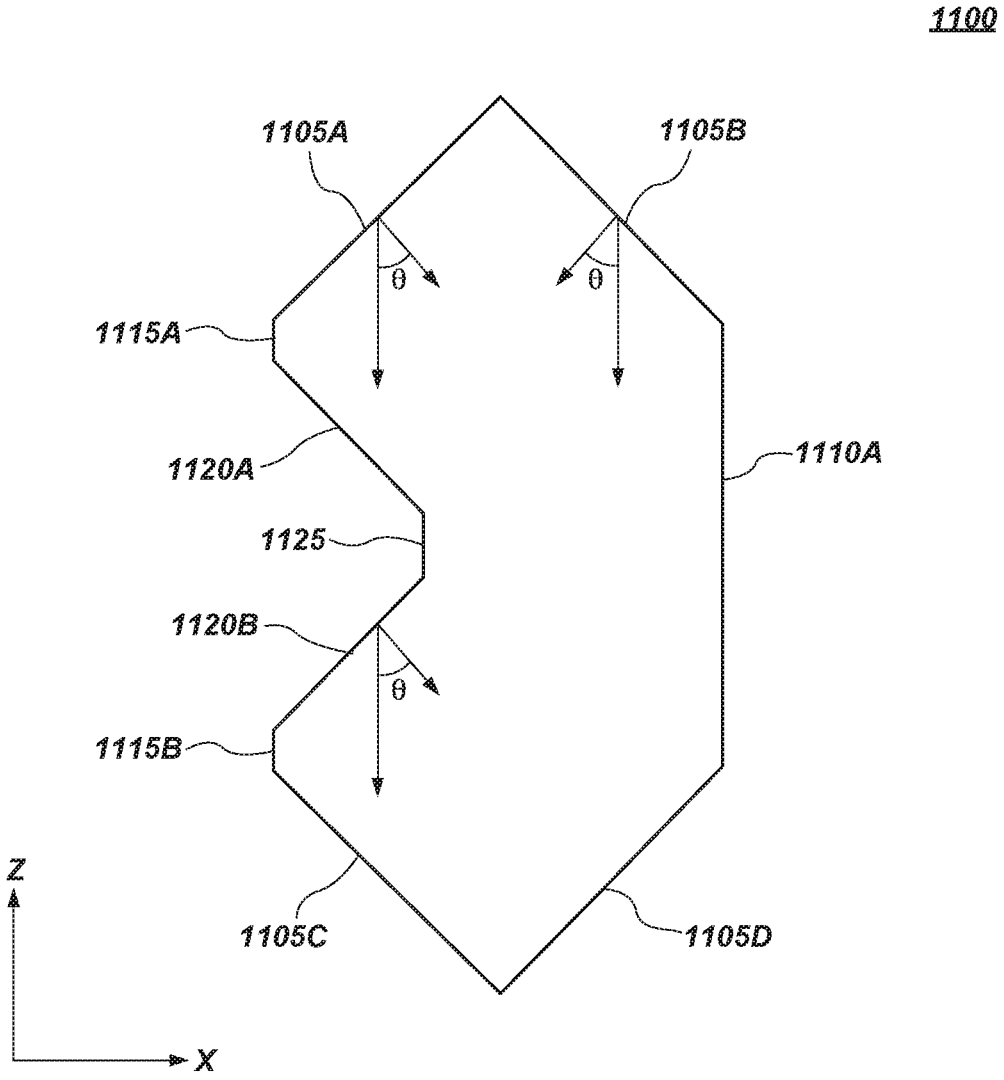
FIG. 11 illustrates an embodiment of a cross section of an irregular hexagonal waveguide having a complex irregular side showing an overhang angle θ of nominally 45° between surface normal and the nadir or negative z-axis vector for all downward facing surfaces.

FIG. 11 illustrates an embodiment of a cross section of an irregular hexagonal waveguide having a complex irregular side showing an overhang angle θ of nominally 45° between surface normal and the nadir or negative z-axis vector for all downward facing surfaces. Waveguide 1100 includes a plurality of sides. As shown in FIG. 11, waveguide 1100 includes a first side 1105A and a second side 1105B which are symmetric with identical lengths. Waveguide 1100 further includes a third side 1105C and a fourth side 1105D which are also symmetric with identical lengths. As shown in FIG. 11, each of sides 1105A-1105D are symmetric with identical lengths. However, as will be discussed in more detail below, sides 1105A-1105D need not be symmetric or have identical lengths. Each of sides 1105A-1105D may have different lengths or some of sides 1105A-1105D may have similar lengths while others of sides 1105A-1105D may have different lengths.

Waveguide 1100 is referred to as an irregular hexagon with a complex side because a fifth side of waveguide 1100, which is a complex side, and sixth side 1110A both have a length that is different from sides 1105A-1105D. Waveguide 1100 includes a complex side identified between first side 1105A and third side 1105C, as shown in FIG. 11. The complex side includes two vertical sides 1115A and 1115B to facilitate printing orientation, as described above, and includes a chamfer implemented by two symmetrical sides 1120A and 1120B which are joined at a third vertical 1125. More simply, a side of an irregular hexagonal waveguide, such as side 110A of waveguide 100 shown in FIG. 1, is formed as being concave into waveguide 1100, as shown in FIG. 11, with three vertical sides 1115A, 1115B, and 1125. Accordingly, waveguide 1100 may be termed a "complex single-ridged waveguide" which provides additional bandwidth capability over that provided by waveguide 100, shown in FIG. 1. Waveguide 1100 includes more than six sides as the term "hexagon" may imply. However, the complex sides of waveguide 1100 may be considered a single side with additional complex angles. Accordingly, waveguide 1100 may be referred to as a hexagonal waveguide, having a plurality of sides.

FIG. 11 further illustrates an overhang angle θ of nominally 45° between surface normal and the nadir or negative z-axis vector for all downward facing surfaces, such as first side 1105A, second side 1105B, and third side 1120B. For example, by maintaining an overhang angle θ of approximately 45°, within 25°, waveguide 1100 may be printed with higher fidelity in an additive manufacturing process. For example, since a waveguide made by an additive manufacturing process is effectively three dimensionally printed with one layer on top of a previous layer, each downward facing surface, such as first side 1105A, second side 1105B, and third side 1120B must be supported by a previous printed layer. Maintaining an overhang angle θ of approximately 45°, within 25°, ensures that enough material has been deposited on a previous layer for a subsequent layer to be fully supported. In this manner, subsequent layers may overhang a previous layer until a downward facing surface is fully printed and supported by nothing more than previous layers of material. Accordingly, waveguide 1100 provides excellent bandwidth and other electrical characteristics while also being fully printable through an additive manufacturing process.

Figure 12:
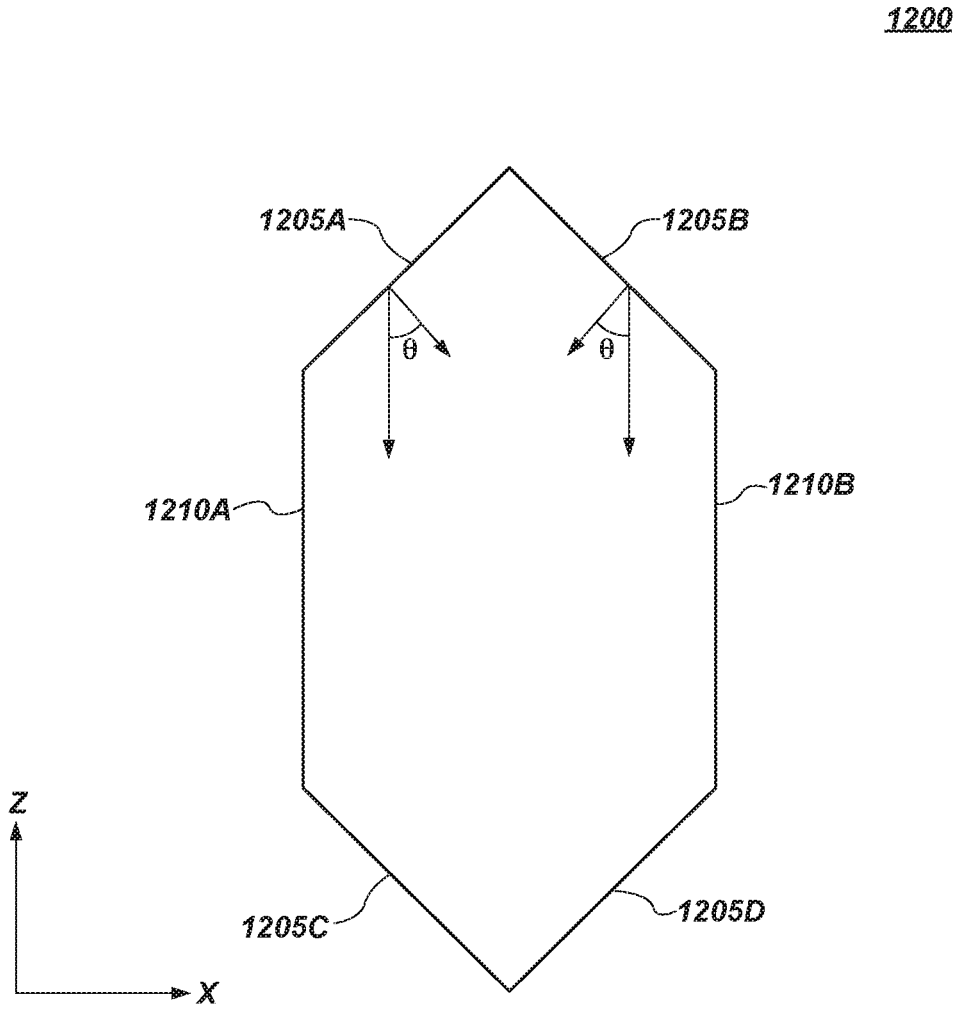
FIG. 12 illustrates an embodiment of a cross section of an irregular hexagonal waveguide showing an overhang angle θ of nominally 45° between surface normal and the nadir or negative z-axis vector for all downward facing surfaces.

FIG. 12 illustrates an embodiment of a cross section of an irregular hexagonal waveguide showing an overhang angle θ of nominally 45° between surface normal and the nadir or negative z-axis vector for all downward facing surfaces. Waveguide 1200 includes a plurality of sides. As shown in FIG. 12, waveguide 1200 includes a first side 1205A and a second side 1205B which are symmetric with identical lengths. Waveguide 1200 further includes a third side 1205C and a fourth side 1205D which are also symmetric with identical lengths. As shown in FIG. 12. each of sides 1205A-1205D are symmetric with identical lengths. However, as will be discussed in more detail below, sides 1205A-1205D need not be symmetric or have identical lengths. Each of sides 1205A-1205D may have different lengths or some of sides 1205A-1205D may have similar lengths while others of sides 1205A-1205D may have different lengths.

Waveguide 1200 is referred to as an irregular hexagon because fifth side 1210A and sixth side 1210B have a length that is different from sides 1205A-1205D. As shown in FIG. 12, fifth side 1210A and sixth side 1210B have a same length that is longer than a length of sides 1205A-1205D. Although, it is conceivable, that fifth side 1210A and sixth side 1210B may have a length that is the same as or shorter than a length of sides 1205A-1205D.

FIG. 12 further illustrates an overhang angle θ of nominally 45° between surface normal and the nadir or negative z-axis vector for all downward facing surfaces, such as first side 1205A and second side 1205B. For example, by maintaining an overhang angle θ of approximately 45°, within 25°, waveguide 1200 may be printed with higher fidelity in an additive manufacturing process. For example, since a waveguide made by an additive manufacturing process is effectively three dimensionally printed with one layer on top of a previous layer, each downward facing surface, such as first side 1205A and second side 1205B must be supported by a previous printed layer. Maintaining an overhang angle θ of approximately 45°, within 25°, ensures that enough material has been deposited on a previous layer for a subsequent layer to be fully supported. In this manner, subsequent layers may overhang a previous layer until a downward facing surface is fully printed and supported by nothing more than previous layers of material. Accordingly, waveguide 1200 provides excellent bandwidth and other electrical characteristics while also being fully printable through an additive manufacturing process.

Figure 13:
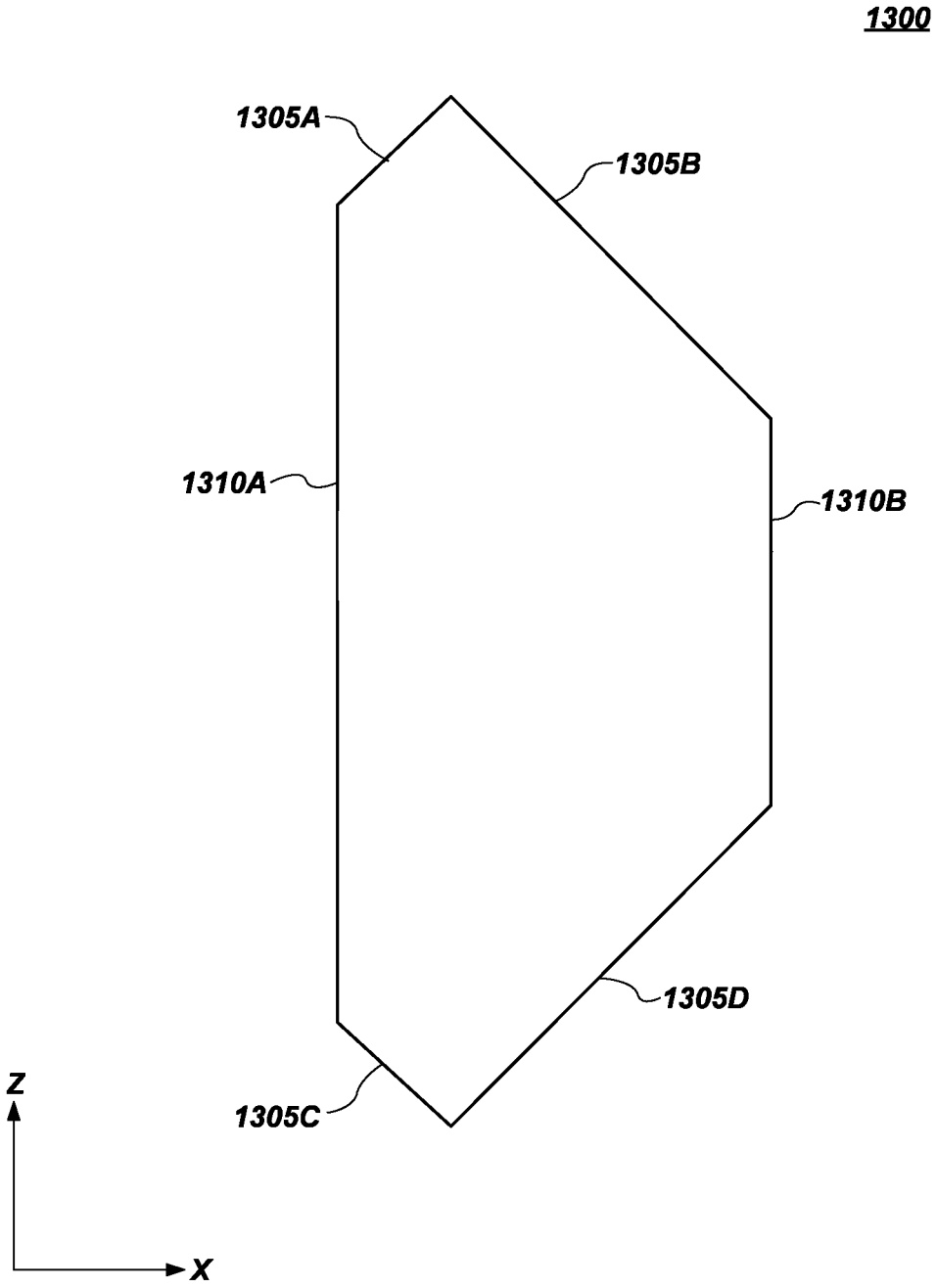
FIG. 13 illustrates an embodiment of a cross section of an irregular hexagonal waveguide.

FIG. 13 illustrates an embodiment of a cross section of an irregular hexagonal waveguide 1300. Waveguide 1300 includes a plurality of sides. As shown in FIG. 13, waveguide 1300 includes a first side 1305A and a second side 1305B which are asymmetric with different lengths. Waveguide 1300 further includes a third side 1305C and a fourth side 1305D which are also asymmetric with different lengths. While it is advantageous that waveguide 1300 be symmetrical about a horizontal centerline bisecting waveguide 1300, it is not required in every embodiment. Each of sides 1305A-1305D may have different lengths or some of sides 1305A-1305D may have similar lengths while others of sides 1305A-1305D may have different lengths. As shown in FIG. 13, first side 1305A and third side 1305C are symmetric about a horizontal centerline of waveguide 1300 while second side 1305B and fourth side 1305D are symmetric about a horizontal centerline of waveguide 1300. As shown in FIG. 13, first side 1305A and third side 1305C are symmetric about a horizontal centerline of waveguide 1300 while second side 1305B and fourth side 1305D are symmetric about a horizontal centerline of waveguide 1300.

Waveguide 1300 is referred to as an irregular hexagon because fifth side 1310A and sixth side 1310B have a length that is different from sides 1305A-1305D and from each other. As shown in FIG. 13, fifth side 1310A has a length that is longer than any of sides 1305A-1305D and 1310B. At the same time, sixth side 1310B has a length that is shorter than sides 1305B, 1305D, and 1310A but longer than first side 1305A and third side 1305C. Nonetheless, waveguide 1300 is another exemplary embodiment of a hexagonal waveguide that is an irregular hexagon. The term "hexagonal" as used herein, may include both irregular or regular hexagonal waveguides while the term "irregular hexagon" or "regular hexagon" excludes a regular hexagon or irregular hexagon, respectively.

Examples

The following examples pertain to features of further embodiments:

Example 1 is a waveguide that comprises a hollow irregular hexagonal metal structure which receives an electromagnetic signal and propagates the signal through the hollow hexagonal metal structure.

Example 2 is the waveguide of example 1, wherein the irregular hexagonal metal structure includes at least two downward facing sides.

Example 3 is the waveguide of examples 1-2, wherein the two downward facing sides are unsupported.

Example 4 is the waveguide of example 1, wherein the irregular hexagon includes a first side, a second side, a third side, a fourth side, a fifth side, and a sixth side, where the first side, the second side, the fifth side and the sixth side have an equal length.

Example 5 is the waveguide of example 4, wherein the third side and the fourth side have an equal length.

Example 6 is the waveguide of examples 4-5, wherein the length of the third side and the fourth side is longer than the length of the first side, the second side, the fifth side, and the sixth side.

Example 7 is the waveguide of example 1, wherein the waveguide is a complex single-ridged waveguide.

Example 8 is the waveguide of example 7, wherein the complex single-ridged waveguide includes a complex side.

Example 9 is the waveguide of example 1, wherein the waveguide is a complex double-ridged waveguide.

Example 10 is the waveguide of example 9, wherein the complex double-ridged waveguide includes two complex sides.

Example 11 is the waveguide of example 1, wherein the waveguide includes a bend of 90°.

Example 12 is the waveguide of example 1, wherein the waveguide includes a bend with an angle of greater than 90°.

Example 13 is the waveguide of example 1, wherein the waveguide is formed using a metal additive manufacturing process.

Example 14 is the waveguide of example 13, wherein the waveguide is printed using the metal additive manufacturing process to include at least two unsupported downward facing surfaces.

Example 15 is the waveguide of examples 13-14, wherein the waveguide includes three unsupported downward facing surfaces.

Example 16 is the waveguide of examples 13-15, wherein the waveguide includes four unsupported downward facing surfaces.

Example 17 is the waveguide of examples 13-14, wherein the at least two unsupported downward facing surfaces are disposed with an overhang angle between 25° and 65° between surface normal and a negative z-axis vector.

Example 18 is the waveguide of examples 13-14 and 17, wherein the at least two unsupported downward facing surfaces are disposed with an overhang angle of 45°.

Example 19 is the waveguide of example 1, wherein the waveguide is symmetric about a horizontal axis that bisects the waveguide.

Example 20 is the waveguide of example 1, wherein the waveguide includes one or more vertical sides.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A waveguide, comprising:

a hollow metal structure which receives an electromagnetic signal and propagates the signal through the hollow metal structure;

wherein the hollow metal structure has an irregular hexagonal shape;

wherein one side of the irregular hexagonal shape of the hollow metal structure is a complex side comprising:

a first vertical side;

a second vertical side; and a chamfer disposed between the first vertical side and the second vertical side.

2. The waveguide of claim 1, wherein the hollow metal structure includes at least two downward facing surfaces.

3. The waveguide of claim 2, wherein the two downward facing surfaces are unsupported.

4. The waveguide of claim 1, wherein respective lengths of two or more sides of the irregular hexagonal shape, other than the complex side, are equal to each other.

5. The waveguide of claim 4, wherein respective lengths of four sides of the irregular hexagonal shape, other than the complex side, are equal to each other.

6. The waveguide of claim 5, wherein respective lengths of two sides of the irregular hexagonal shape, including the complex side, are longer than lengths of the four sides of the irregular hexagonal shape that are equal to each other.

7. The waveguide of claim 1, wherein the waveguide having the complex side is a single-ridged waveguide comprising only one complex side.

8. The waveguide of claim 1, wherein the chamfer comprises two symmetrical sides joined by a third vertical side.

9. The waveguide of claim 1, wherein the waveguide having the complex side is a double-ridged waveguide comprising at least two complex sides.

10. The waveguide of claim 1, wherein the waveguide includes a vertical side that is not part of the complex side.

11. The waveguide of claim 1, wherein the waveguide includes a bend of 90°.

12. The waveguide of claim 1, wherein the waveguide includes a bend with an angle of greater than 90°.

13. The waveguide of claim 1, wherein the waveguide is formed using a metal additive manufacturing process.

14. The waveguide of claim 13, wherein the waveguide is printed using the metal additive manufacturing process to include at least two downward facing surfaces that are unsupported by any removable support structure.

15. The waveguide of claim 14, wherein the waveguide includes three downward facing surfaces that are unsupported by any removable support structure.

16. The waveguide of claim 15, wherein the waveguide includes four downward facing surfaces that are unsupported by any removable support structure.

17. The waveguide of claim 14, wherein the at least two downward facing surfaces are disposed with an overhang angle between 25° and 65° between a surface normal and a negative z-axis vector.

18. The waveguide of claim 17, wherein the at least two downward facing surfaces are disposed with an overhang angle of 45°.

19. The waveguide of claim 1, wherein the waveguide is symmetric about a horizontal axis that bisects the waveguide.

[20. A waveguide, comprising:

a hollow metal structure which receives an electromagnetic signal and propagates the signal through the hollow metal structure;

wherein the hollow metal structure has an irregular hexagonal shape; and wherein the waveguide includes a bend of 90°.]

21. A waveguide, comprising:

a hollow metal structure which receives an electromagnetic signal and propagates the signal through the hollow metal structure;

wherein the hollow metal structure has an irregular hexagonal shape; and wherein the waveguide includes a bend with an angle of greater than 90°.

* * * * *